United States Patent
Kong et al.

(10) Patent No.: US 8,358,700 B2
(45) Date of Patent: Jan. 22, 2013

(54) VIDEO CODING APPARATUS AND METHOD FOR SUPPORTING ARBITRARY-SIZED REGIONS-OF-INTEREST

(75) Inventors: Hao-Song Kong, Sunnyvale, CA (US); Jian Zhou, Fremont, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 1268 days.

(21) Appl. No.: 12/132,407

(22) Filed: Jun. 3, 2008

(65) Prior Publication Data

US 2009/0296810 A1 Dec. 3, 2009

(51) Int. Cl.
*H04N 11/04* (2006.01)

(52) U.S. Cl. .......... 375/240.24; 375/240.27; 375/240.28

(58) Field of Classification Search .................. None
See application file for complete search history.

(56) References Cited

U.S. PATENT DOCUMENTS

| | | | | |
|---|---|---|---|---|
| 6,108,448 | A * | 8/2000 | Song et al. | 382/235 |
| 6,115,070 | A * | 9/2000 | Song et al. | 375/240.12 |
| 6,490,319 | B1 | 12/2002 | Yang | |
| 6,993,074 | B2 * | 1/2006 | Zhang et al. | 375/240.11 |
| 7,206,456 | B2 | 4/2007 | Hannuksela et al. | |
| 7,302,001 | B2 | 11/2007 | Wang et al. | |
| 2006/0215766 | A1 * | 9/2006 | Wang et al. | 375/240.24 |
| 2006/0233239 | A1 * | 10/2006 | Sethi et al. | 375/240.03 |
| 2007/0110154 | A1 | 5/2007 | Wang et al. | |
| 2007/0189623 | A1 | 8/2007 | Ryu | |

OTHER PUBLICATIONS

Baccichet et al., "Network-Aware H.264/AVC Region-of-Interest Coding for a Multi-Camera Wireless Surveillance Network," Proc. Picture Coding Symposium—PCS, Beijing, China, Apr. 2006.
Bacchichet et al., "Robust Low-Delay Video Transmission Using H.264/AVC Redundant Slices and Flexible Macroblock Ordering," IEEE International Conference on Image Processing (ICIP 2007), San Antonio, Texas, Sep. 2007.
Cho et al., "Region-Based SPIHT Coding and Multiresolution Decoding of Image Sequences," Proc. Picture Coding Symposium, PCS-2001, p. 283-286, Apr. 2001.
Kong et al., "Fast Region-of-Interest Transcoding for JPEG 2000 Images," Mitsubisihi Electric Research Laboratories, http://www.merl.com, TR2005-043, Dec. 2005.
Kong, et al., "ROI-Based SNR Scalable JPEG2000 Image Transcoding," Proc. Visual Communications and Image Processing, Beijing, China, Jul. 2005.
Schwenke, et al., "Dynamic Rate Control for JPEG 2000 Transcoding," Mitsubishi Electric Research Laboratories, http://www.merl.com, TR2006-073, Jul. 2006.
H.264/AVC JM Reference Software, H.264/AVC Software Coordination, http://iphome.hhi.de/suehring/tml/, printed on Jun. 2, 2008.
ITU-T Rec. H.264, "Advanced Video Coding for Generic Audiovisual Services," Mar. 2005.

\* cited by examiner

*Primary Examiner* — Hassan Phillips
*Assistant Examiner* — Mark A Mais
(74) *Attorney, Agent, or Firm* — Lathrop & Gage LLP

(57) ABSTRACT

A computer readable storage medium has executable instructions to select a plurality of macroblocks in a video sequence to be coded as anchor macroblocks, the anchor macroblocks distributed across the video sequence and facilitating random access decoding of a portion of the video sequence. The video sequence is coded into a bit stream. Auxiliary information associated with the anchor macroblocks is generated. The auxiliary information associated with the anchor macroblocks is inserted in a supplementary section of the bit stream.

14 Claims, 14 Drawing Sheets

```
500

Unsigned char pred[16], residual[16], best_mode[16];
    int min_cost = MAXVALUE;
    int mode, cost;
    For (int i=0; i<9; i++) {

// form the prediction block with mode i, and substract
        // it from the original block to form the residual block
        // notice that, the prediction is from the RECONSTRUCTED
        // neighbor blocks residual = Get_Pred ( pred, i);

// the cost of the candidate mode can be SAD, SSE, or R-D based cost = Get_Cost (residual);

if (cost < min_cost) {
            min_cost = cost;
            mode = i;
            // copy the best residual block
            save_mode (best_mode, residual);
        }
    }

// the residual block associated with the best mode will be applied to the rest
    // of the coding loop
```

FIG. 5
(Prior Art)

VIDEO CODING APPARATUS AND METHOD FOR SUPPORTING ARBITRARY-SIZED REGIONS-OF-INTEREST

FIELD OF THE INVENTION

This invention relates generally to video coding. More particularly, this invention relates to a video coding apparatus and method that supports arbitrary-sized regions-of-interest and enables partial video content to be displayed at different resolutions in multiple devices.

BACKGROUND OF THE INVENTION

Digital video coding technology enables the efficient storage and transmission of the vast amounts of visual data that compose a digital video sequence. With the development of international digital video coding standards, digital video has now become commonplace in a host of applications, ranging from video conferencing and DVDs to digital TV, mobile video, and Internet video streaming and sharing. Digital video coding standards provide the interoperability and flexibility needed to fuel the growth of digital video applications worldwide.

There are two international organizations currently responsible for developing and implementing digital video coding standards: the Video Coding Experts Group ("VCEG") under the authority of the International Telecommunication Union—Telecommunication Standardization Sector ("ITU-T") and the Moving Pictures Experts Group ("MPEG") under the authority of the International Organization for Standardization ("ISO") and the International Electrotechnical Commission ("IEC"). The ITU-T has developed the H.26x (e.g., H.261, H.263) family of video coding standards and the ISO/IEC has developed the MPEG-x (e.g., MPEG-1, MPEG-4) family of video coding standards. The H.26x standards have been designed mostly for real-time video communication applications, such as video conferencing and video telephony, while the MPEG standards have been designed to address the needs of video storage, video broadcasting, and video streaming applications.

The ITU-T and the ISO/IEC have also joined efforts in developing high-performance, high-quality video coding standards, including the previous H.262 (or MPEG-2) and the recent H.264 (or MPEG-4 Part 10/AVC) standard. The H.264 video coding standard, adopted in 2003, provides high video quality at substantially lower bit rates (up to 50%) than previous video coding standards. The H.264 standard provides enough flexibility to be applied to a wide variety of applications, including low and high bit rate applications as well as low and high resolution applications, such as video telephony, video gaming, video surveillance and many others. Other advanced multimedia applications may be easily deployed over existing and future networks.

The H.264 video coding standard has a number of advantages that distinguish it from other existing video coding standards, while sharing common features with those standards. The basic video coding structure of H.264 is illustrated in FIG. 1. H.264 video coder 100 divides each video frame of a digital video sequence into 16×16 blocks of pixels (referred to as "macroblocks") so that processing of a frame may be performed at a block level.

Each macroblock may be coded as an intra-coded macroblock by using information from its current video frame or as an inter-coded macroblock by using information from its previous frames. Intra-coded macroblocks are coded to exploit the spatial redundancies that exist within a given video frame through transform, quantization, and entropy (or variable-length) coding. Inter-coded macroblocks are coded to exploit the temporal redundancies that exist between macroblocks in successive frames, so that only changes between successive frames need to be coded. This is accomplished through motion estimation and compensation.

In order to increase the efficiency of the intra coding process for the intra-coded macroblocks, spatial correlation between adjacent macroblocks in a given frame is exploited by using intra prediction 105. Since adjacent macroblocks in a given frame tend to have similar visual properties, a given macroblock in a frame may be predicted from already coded, surrounding macroblocks. The difference or residual between the given macroblock and its prediction is then coded, thereby resulting in fewer bits to represent the given macroblock as compared to coding it directly. A block diagram illustrating intra prediction in more detail is shown in FIG. 2.

Intra prediction may be performed for an entire 16×16 macroblock or it may be performed for each 4×4 block within a 16×16 macroblock. These two different prediction types are denoted by "Intra_16×16" and "Intra_4×4", respectively. The Intra_16×16 mode is more suited for coding very smooth areas of a video frame, while the Intra_4×4 mode is more suited for coding areas of a video frame having significant detail.

In the Intra_4×4 mode, each 4×4 block is predicted from spatially neighboring samples as illustrated in FIGS. 3A-3B. The sixteen samples of the 4×4 block 300 which are labeled as "a-p" are predicted using prior decoded, i.e., reconstructed, samples in adjacent blocks labeled as "A-Q." That is, block X 305 is predicted from reconstructed pixels of neighboring blocks A 310, B 315, C 320, and D 325. Specifically, intra prediction is performed using data in blocks above and to the left of the block being predicted, by, for example, taking the lower right pixels of the block above and to the left of the block being predicted, the lower row of pixels of the block above the block being predicted, the lower row of pixels of the block above and to the right of the block being predicted, and the right column of pixels of the block to the left of the block being predicted.

For each 4×4 block in a macroblock, one of nine intra prediction modes defined by the H.264 video coding standard may be used. The nine intra prediction modes are illustrated in FIG. 4. In addition to a "DC" prediction mode (Mode 2), eight directional prediction modes are specified. Those modes are suitable to predict directional structures in a video frame such as edges at various angles.

Typical H.264 video coders select one from the nine possible Intra_4×4 prediction modes according to some criterion to code each 4×4 block within an intra-coded macroblock, in a process commonly referred to as intra coding "mode decision" or "mode selection". Once the intra prediction mode is selected, the prediction pixels are taken from the reconstructed version of the neighboring blocks to form the prediction block. The residual is then obtained by subtracting the prediction block from the current block, as illustrated in FIG. 2.

The mode decision criterion usually involves optimization of a cost to code the residual, as illustrated in FIG. 5 with the pseudo code implemented in the JM reference encoder publicly available at http://iphome.hhi.de/suehring/tml/. The residual is the difference of the pixel values between the current block and the predicted block formed by the reconstructed pixels in the neighboring blocks. The cost evaluated can be a Sum of the Absolute Differences ("SAD") cost between the original block and the predicted block, a Sum of the Square Differences ("SSE") cost between the original block and the predicted block, or, more commonly utilized, a rate-distortion cost. The rate-distortion cost evaluates the Lagrange cost for predicting the block with each candidate mode out of the nine possible modes and selects the mode that yields the minimum Lagrange cost.

Because of its high coding efficiency, the H.264 video coding standard is able to compress multimedia contents at low bit rates while achieving good visual quality. The H.264 video coding standard is also designed to provide robustness in error-prone environments and content-based scalability. These features allow H.264-encoded video to be accessible over a wide range of media at various qualities and temporal and spatial resolutions. Despite these beneficial functionalities, however, typical H.264 video coders are not suited for coding a single video sequence for distribution to multiple users at multiple devices. This is because when H.264 video coders encode a video sequence for distribution, they do not typically know the types of devices where the video sequence will be played at. As a result, a video sequence encoded by pre-set coding parameters may be unable to be displayed on some devices.

For example, suppose a video sequence is coded with a H.264 video coder at a given bit rate, visual quality and resolution. The video sequence may be distributed to a user of a personal computer, a user of a personal digital assistant, and a user of a small mobile device. Depending on the bit rate and resolution of the encoded video sequence, it may be impractical—or even impossible with some of the devices that are currently available—for the user of the personal digital assistant and/or the user of the small mobile device to view the video sequence. In particular, the display screen size of those devices may be too small for the video sequence to be properly displayed, in addition to other bandwidth and memory constraints.

To address these different display sizes and device capabilities, several techniques have been proposed. The most popular ones involve transcoding and/or encoding a Region-of-Interest ("ROI") within a video sequence. In general, transcoding techniques convert the bit rate of a coded video sequence to match the bandwidth and other requirements of the display device. In ROI transcoding, a video sequence is divided in two parts: one representing the ROI and the other representing the background. The ROI may be any region or portion of the video sequence of interest to a user, such as, for example, a given object, person, or area within a scene. In most cases, the ROI is defined as a rectangular region surrounding the portion of the video sequence of interest. The user may identify the rectangular region prior to encoding the video sequence or specify it during decoding.

For example, in one technique users have to interact with a network server to specify the ROI and wait for the transcoded sequence. The ROI is typically sent with high visual quality and the background is either sent with low visual quality or not sent at all depending on the network bandwidth. In another example, the ROI is pre-specified during encoding, which takes advantage of the Flexible Macroblock Ordering ("FMO") feature available in the H.264 video coding standard to prioritize particular slice groups. In yet another example, a preprocessor is used to identify a ROI, which is then coded and transmitted using a FMO mapping function.

These and other ROI-based transcoding techniques are limited in that once the ROI is determined, its size and position cannot be modified during the decoding process. That is, an arbitrary-sized ROI cannot be extracted at different access points of the video sequence. For example, consider a single video sequence of a customer shopping at a store. The store security personnel may desire to select a ROI around an aisle in the store for proper identification of a customer suspected of shoplifting at that aisle. The store security personnel may also desire to select a ROI around the cashier region of the store to get a better view of the suspect's face. With currently available H.264 video coders, the store security personnel cannot decode the single video sequence to have access to lower resolution, but yet, ROI-focused portions of the video sequence, i.e., the portions corresponding to the particular aisle and cashier region of the store.

Accordingly, it would be desirable to provide video coding techniques for supporting extraction of arbitrary-sized ROIs at different access points during decoding of a video sequence. In particular, it would be desirable to provide a video coding technique such that a video sequence can be encoded once and used by multiple devices with different display screen sizes and video decoding/playing capabilities.

SUMMARY OF THE INVENTION

The invention includes a computer readable storage medium with executable instructions to select a plurality of macroblocks in a video sequence to be coded as anchor macroblocks, the anchor macroblocks distributed across the video sequence and facilitating random access decoding of a portion of the video sequence. The video sequence is coded into a bit stream. Auxiliary information associated with the anchor macroblocks is generated. The auxiliary information associated with the anchor macroblocks is inserted in a supplementary section of the bit stream.

An embodiment of the invention includes a computer readable storage medium with executable instructions to receive a bit stream of a coded video sequence having a plurality of coded macroblocks, the bit stream comprising a supplementary section identifying a plurality of anchor macroblocks. Coordinates for a region of interest are received. The bit stream is searched to locate an anchor macroblock in the supplementary section, the anchor macroblock positioned close to the region of interest. A portion of the video sequence is decoded starting at the anchor macroblock and including the region of interest.

Another embodiment of the invention includes an integrated circuit chip for encoding and decoding a video sequence. An encoder module encodes a video sequence with anchor macroblocks in a bit stream, the anchor macroblocks distributed at different access points in the video sequence. An interface module receives coordinates for a region of interest. A decoder module locates an anchor macroblock close to the region of interest in the bit stream and decodes a portion of the video sequence starting at the anchor macroblock and including the region of interest.

Another embodiment of the invention includes a method for providing fast access to a region of interest in a video sequence. The video sequence is coded into a bit stream with anchor macroblocks positioned at different access points of the video sequence, the anchor macroblocks identified in a supplementary section of the bit stream. Coordinates specifying a region of interest are received from a user. A portion of the video sequence including the region of interest is decoded, the portion starting at an anchor macroblock positioned close to the region of interest and ending at the end of the region of interest.

BRIEF DESCRIPTION OF THE DRAWINGS

The invention is more fully appreciated in connection with the following detailed description taken in conjunction with the accompanying drawings, in which like reference characters refer to like parts throughout, and in which:

FIG. 5 illustrates pseudo-code used for the Intra_4×4 coding mode decision stage of a reference H.264 encoder;

DETAILED DESCRIPTION OF THE INVENTION

The present invention provides an apparatus, method, and computer readable storage medium for supporting arbitrary-sized regions-of-interest in a video coder so that partial video content can be displayed at different resolutions in multiple devices. The video coder, as generally used herein, refers to any video encoder and/or decoder for encoding and/or decoding a video sequence into/from a bit stream, such as, for example, video coders compliant with the H.264 video coding standard. The region-of-interest ("ROI") generally refers to any region, area, or portion of the video sequence that may be interest to a user, such as, for example, a given object, person, or area within a video scene.

According to an embodiment of the invention, a video sequence is encoded to facilitate decoding of only a portion of the video sequence corresponding to the ROI. Anchor macroblocks are distributed across intra-coded frames of the video sequence and identified with auxiliary information in a supplementary section of the bit stream. In one embodiment, the supplementary section may be a Supplementary Enhancement Information ("SEI") section as specified in the H.264 video coding standard. As described in more detail herein below, the anchor macroblocks serve as decoding access points in the bit stream for extracting the portion of the video sequence corresponding to the ROI. The bit stream may be made fully compliant with the H.264 video coding standard.

In one embodiment, the ROI may be any arbitrary-sized ROI, such as, for example, a user-specified rectangular area around an area of interest in the video sequence and defined with spatial coordinates. Decoding of the video sequence may then be performed starting at an anchor macroblock closest to the ROI, e.g., an anchor macroblock closest to the top-left coordinate of the ROI, and ending at the end of the ROI. The distribution of the anchor macroblocks can be very flexible and specified as needed by different applications. For a fully H.264 standard compatible decoder, the auxiliary information in the SEI can simply be ignored and the entire video sequence can be decoded as usual.

Figure 1:
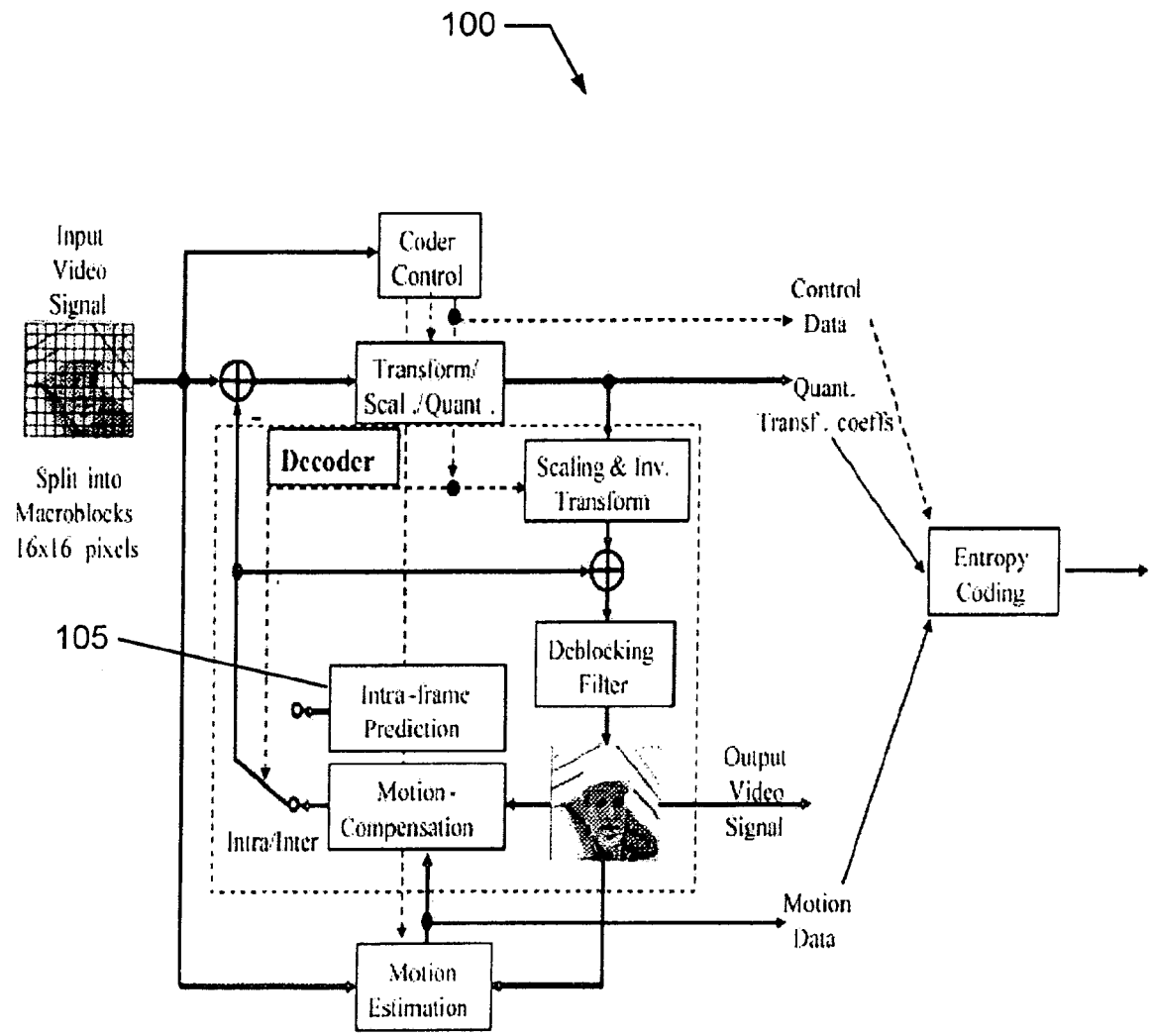
FIG. 1 illustrates the basic video coding structure of the H.264 video coding standard.
Figure 2:
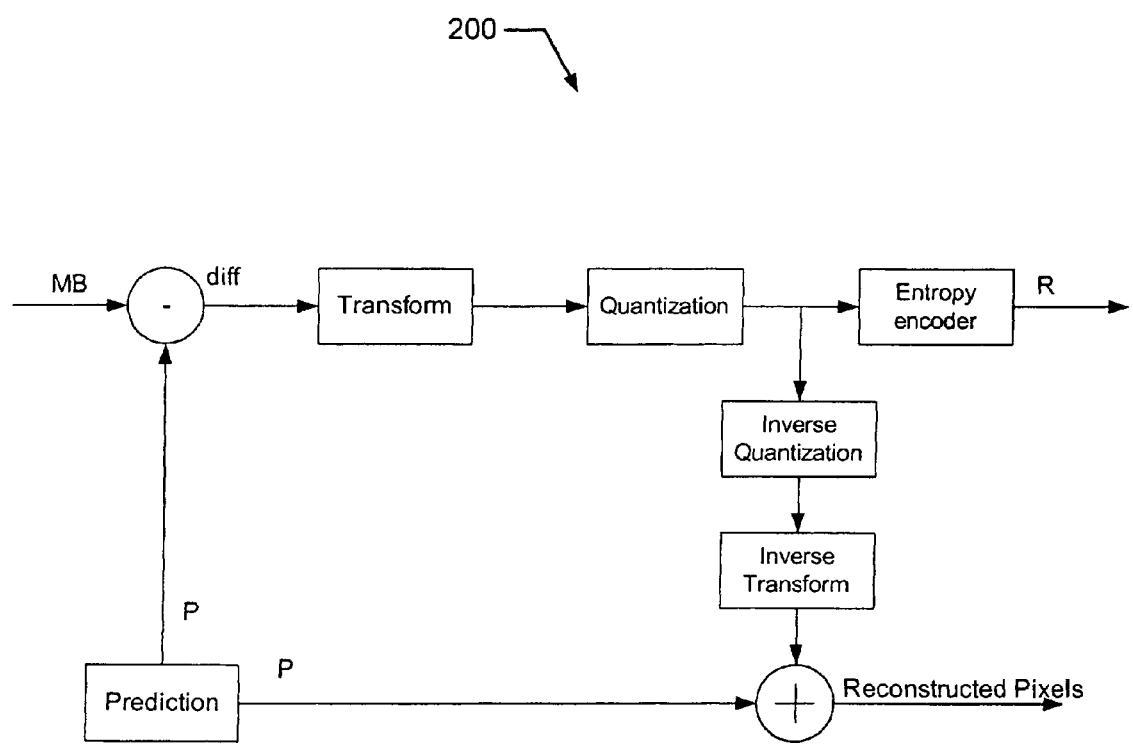
FIG. 2 illustrates a block diagram of intra prediction in the H.264 video coding standard.
Figures 3A, 3B:
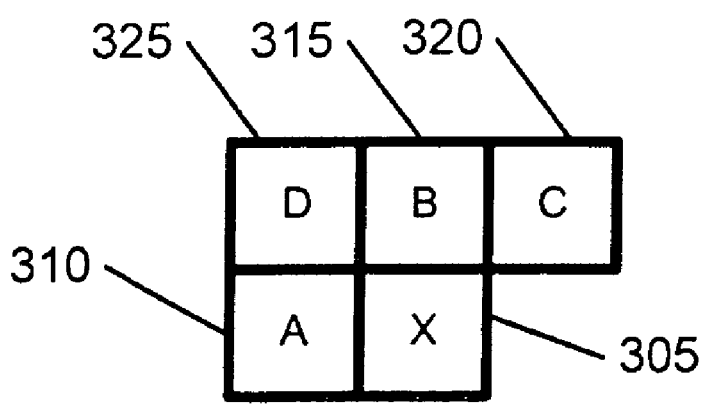
FIG. 3A illustrates a 4×4 block predicted from spatially neighboring samples according to the H.264 video coding standard.
FIG. 3B illustrates a 4×4 block predicted from neighboring blocks according to the H.264 video coding standard.
Figure 4:
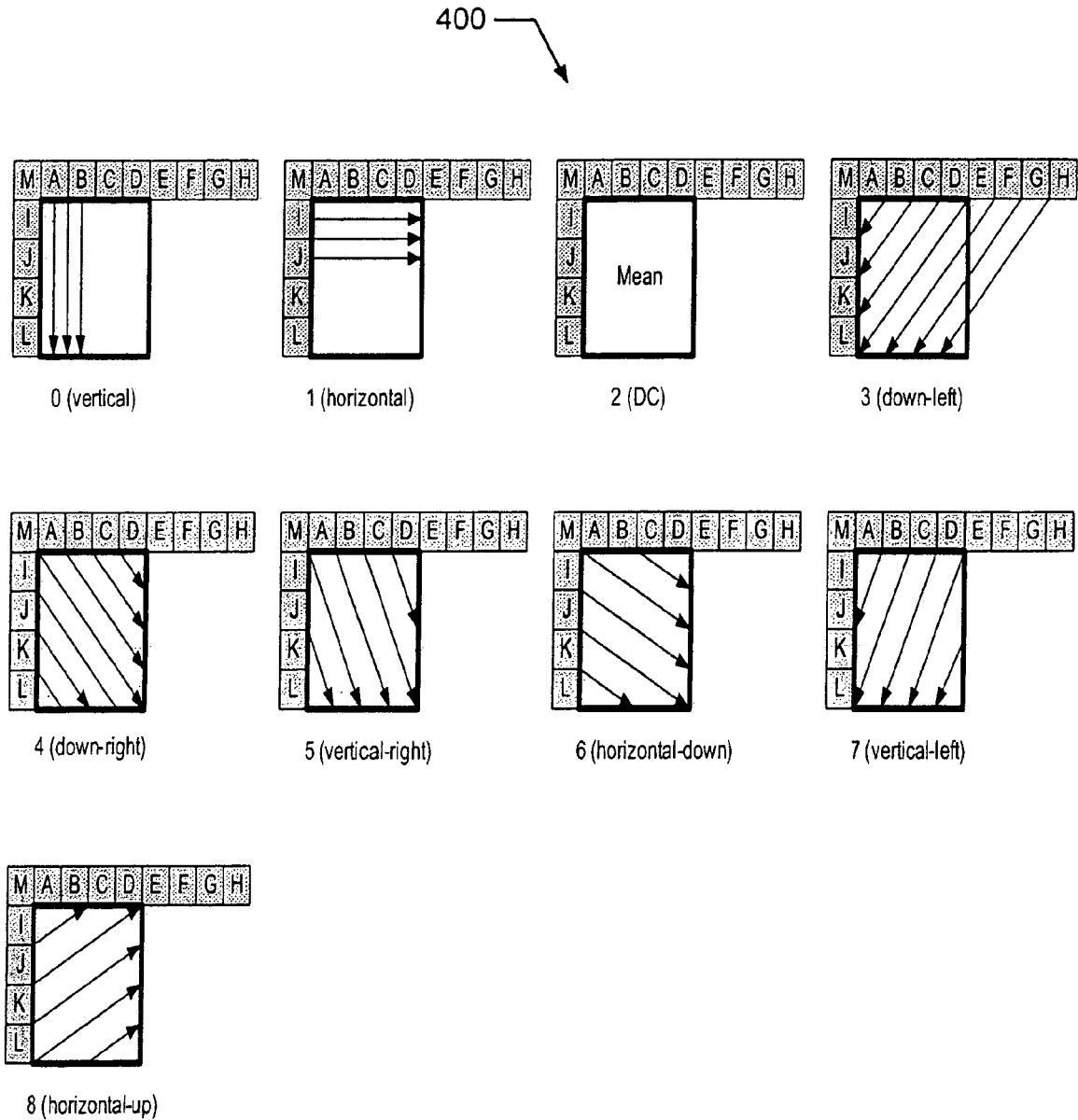
FIG. 4 illustrates the nine Intra_4×4 prediction modes of the H.264 video coding standard.
Figure 6:
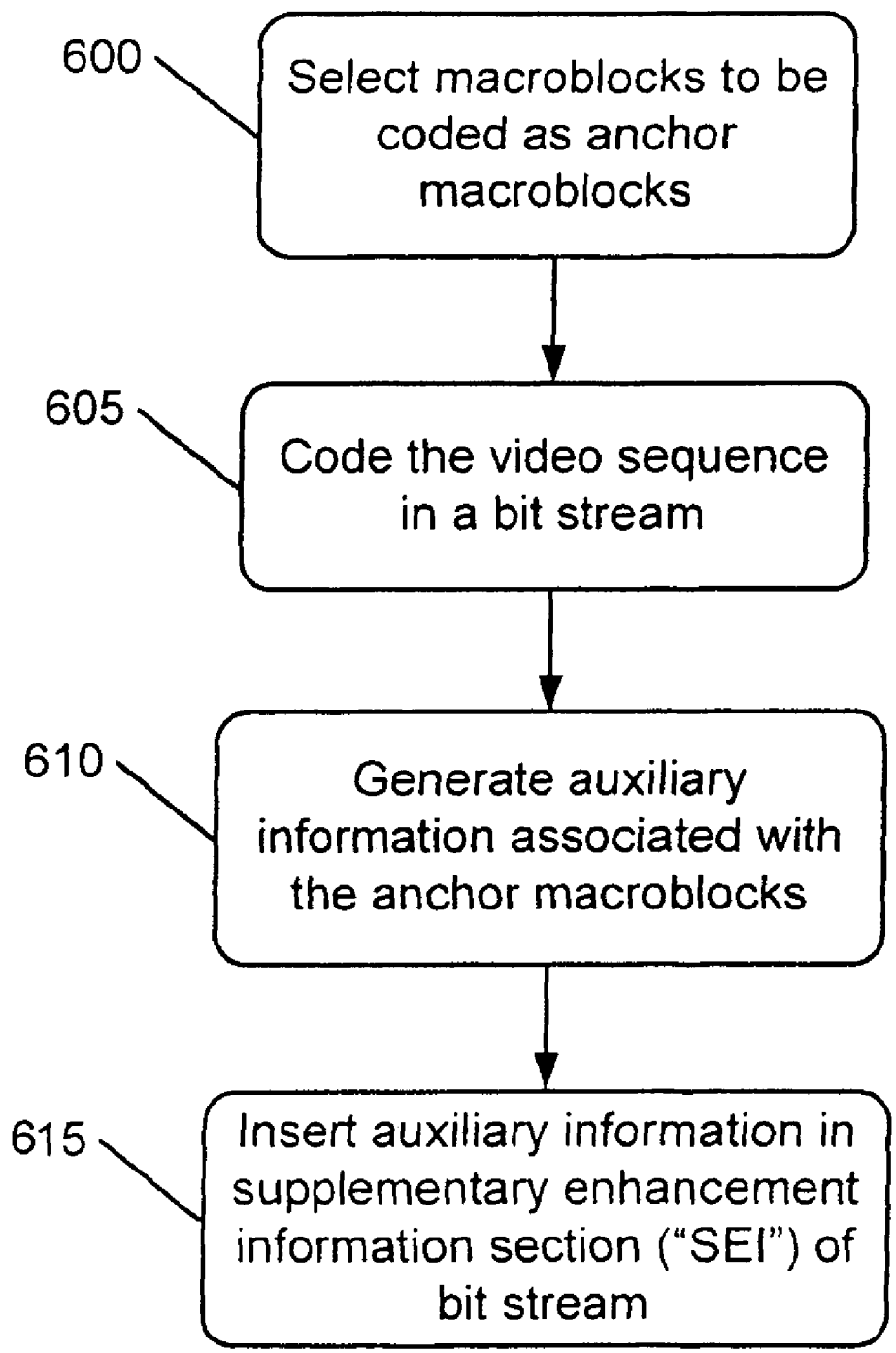
FIG. 6 illustrates a flow chart for coding a video sequence in accordance with an embodiment of the invention.

FIG. 6 illustrates a flow chart for coding a video sequence in accordance with an embodiment of the invention. The video sequence may be any digital video sequence, such as video sequence in the YUV 4:2:0 color format. First, macroblocks are selected to be coded as anchor macroblocks in step 600. The anchor macroblocks are selected from intra-coded frames and distributed to facilitate the extraction of ROIs easily and efficiently by a decoder. For example, in one embodiment, anchor macroblocks are distributed in spatially apart positions in intra-coded frames of the video sequence. That is, each intra-coded frame has a set of anchor macroblocks that are spatially separated across the frame.

Next, the video sequence is coded into a bit stream in step 605. In one embodiment, the video sequence may be coded according to the H.264 video coding standard, as described in more detail herein below with reference to FIG. 7. Anchor macroblocks are coded in Intra_16×16 DC mode to enable them to serve as access points for decoding the bit stream, that is, to enable the bit stream to be decoded starting at any anchor macroblock.

The anchor macroblocks are identified in the bit stream with auxiliary information in step 610. The auxiliary information may include, for example, luma and chroma DC prediction values for the anchor macroblocks, delta quantization parameters for the anchor macroblocks, offset positions of the anchor macroblocks in the bit stream, and number of nonzero coefficients in the anchor macroblocks. The auxiliary information is inserted in a SEI section of the bit stream in step 615. The bit stream may be fully compatible with the H.264 video coding standard.

As described above and appreciated by one of ordinary skill in the art, the DC intra prediction mode is used to predict a macroblock with a single value, i.e., the mean pixel values of neighboring macroblocks. Coding anchor macroblocks with this mode implies that each coded anchor macroblock is predicted with a single DC value for the luminance component and a single DC value for each of the two chrominance components. Identifying these DC values in the supplementary section of the bit stream (i.e., the luma and chroma DC prediction values) enables a decoder to start decoding from any anchor macroblock without losing the inter-dependency on neighboring macroblocks, as it is the case with other intra prediction modes.

It is also appreciated that the H.264 video coding standard is used as an exemplary video coding standard only. Other video coding standards may be used to code a video sequence without deviating from the principles and scope of the invention. Further, it is appreciated that the number and position of the anchor macroblocks is very flexible. Any number and positions may be chosen as desired and needed by different applications. A default number and positions of anchor macroblocks may also be used across applications. For example, anchor macroblocks may be located at every intra-coded frame, on the edges and at every 5$^{th}$ row and column of each intra-coded frame. Other configurations may also be used as desired.

Figure 7:
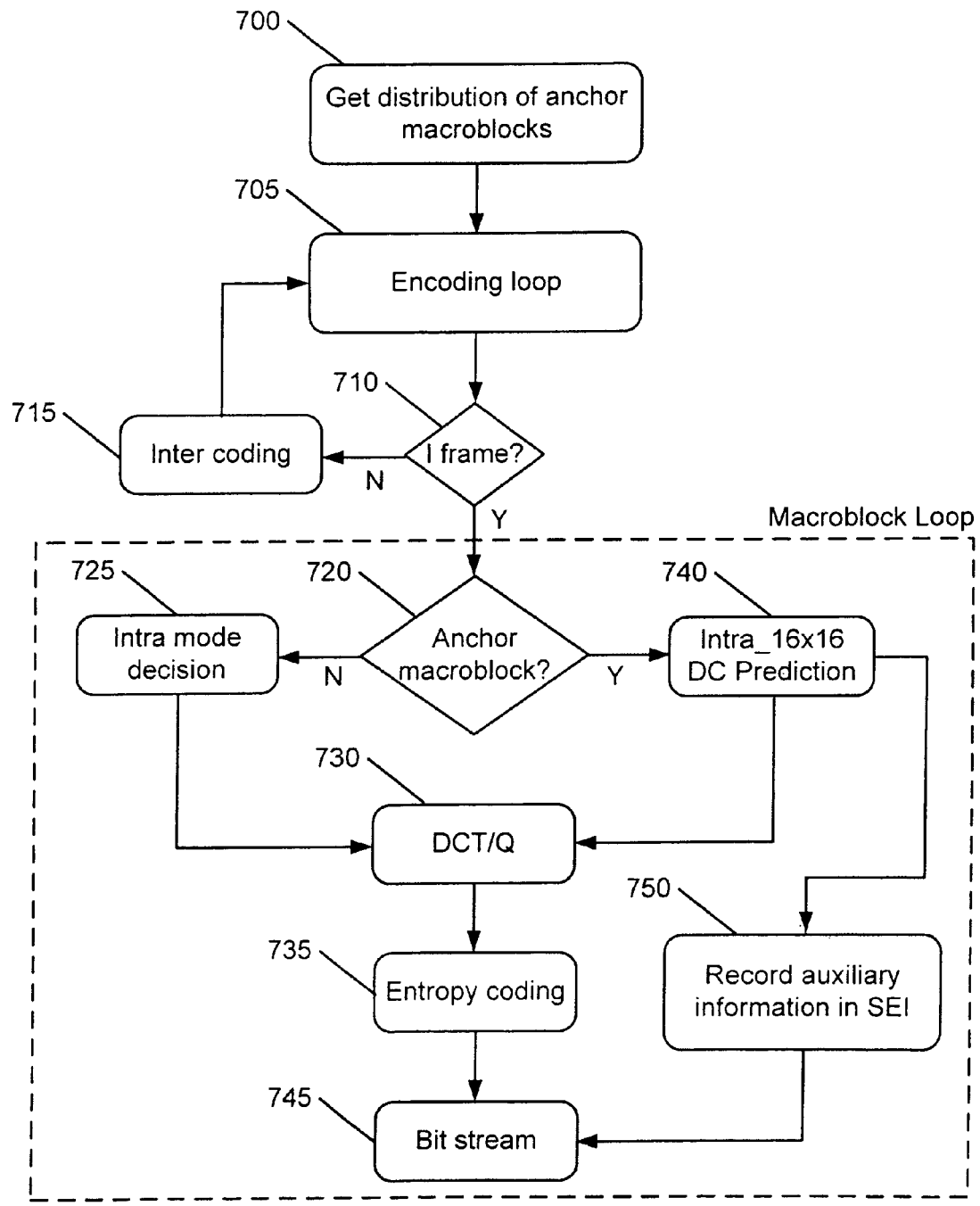
FIG. 7 illustrates a more detailed flow chart for coding a video sequence in accordance with an embodiment of the invention.

Referring now to FIG. 7, a more detailed flow chart for coding a video sequence in accordance with an embodiment of the invention is described. First, a distribution of anchor macroblocks is specified in step 700. The anchor macroblocks may be distributed as specified by a given application or according to a default distribution used across applications. The encoding loop starts in step 705 by checking the coding type of each frame of the video sequence in step 710, that is, by checking whether each frame is to be coded as an intra frame or as an inter frame. Inter-coded frames are coded as specified by the video coder, such as by using inter prediction and motion estimation and compensation in step 715.

For intra-coded frames, the encoder proceeds to check whether each macroblock is to be coded as an anchor macroblock in step 720. If not, the macroblock is coded as usual by performing intra mode prediction in step 725, DCT and quantization in step 730, and entropy coding in step 735. Otherwise, the anchor macroblock is coded by specifying DC as the intra prediction mode in step 740, e.g., by performing 16×16 luma DC prediction and 8×8 chroma DC prediction. The anchor macroblock is then coded as usual with DCT and quantization in step 730 and entropy coding in step 735.

After all the intra and inter frames are coded, the coded frames are formatted into a bit stream in step 745. Auxiliary information identifying the macroblock is generated and inserted in the SEI section of the bit stream in step 750. In one embodiment, the bit stream is fully compatible with the H.264 video coding standard.

Figure 8:
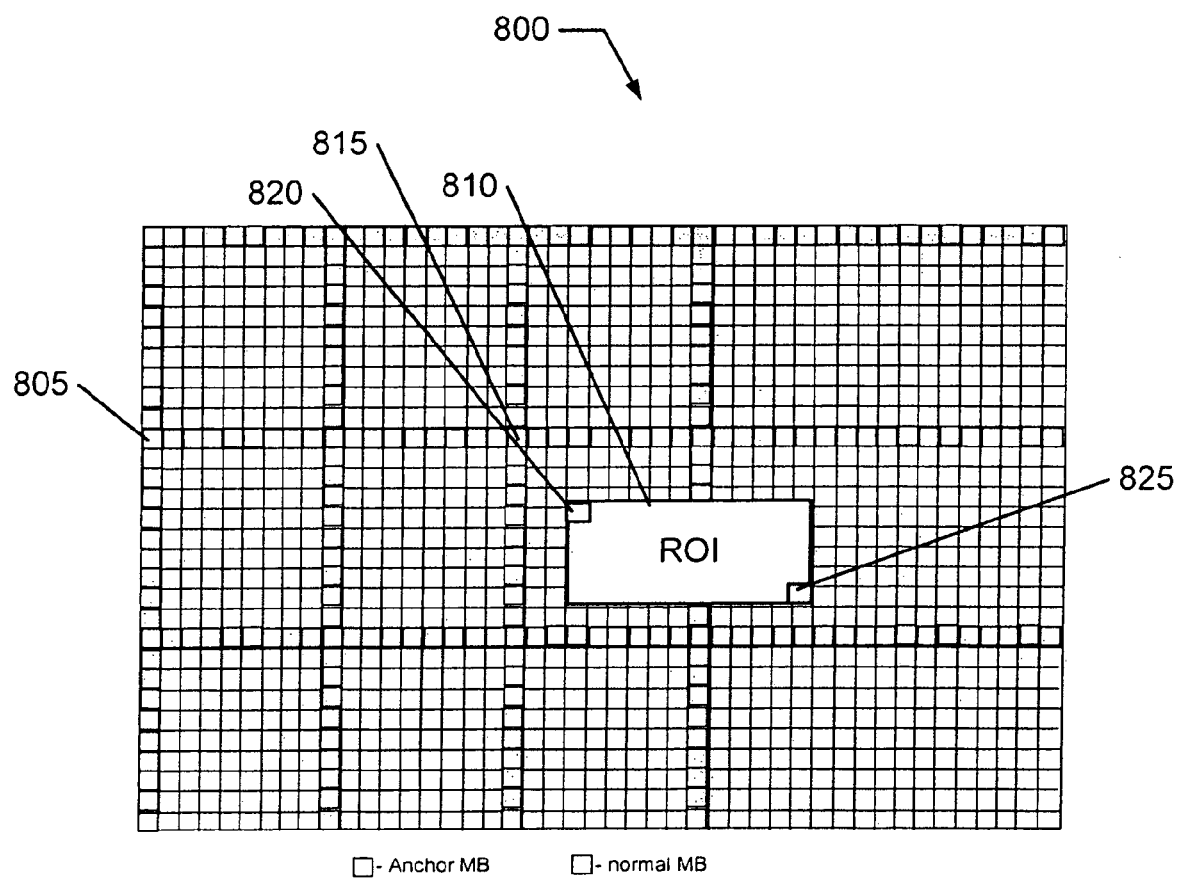
FIG. 8 illustrates a schematic diagram of an intra-coded frame with spatially apart anchor macroblocks in accordance with an embodiment of the invention.

An example of a anchor macroblock distribution is shown in FIG. 8. Frame 800 is a 720×480 intra-coded frame with 16×16 macroblocks. The macroblocks selected as anchor macroblocks, e.g., macroblocks 805, are shown in FIG. 8 as the shaded macroblocks occurring on the edges of frame 800 and at approximately every $10^{th}$ column and $11^{th}$ row. As described herein above, any distribution of anchor macroblocks may be selected as desired by the user and application. Further, the distribution of anchor macroblocks may be applied at every intra-coded frame of the video sequence for at a portion of the intra-coded frames. The same distribution may be selected for all the intra frames or, alternatively, multiple distributions may be used for different intra frames in a single video sequence.

As described above, the anchor macroblocks are used as access points for decoding the video sequence. For example, suppose a user desires to decode only the portion of the video sequence corresponding to ROI 810. According to an embodiment of the invention, decoding starts from an anchor macroblock closest to the top-left coordinate of ROI 810, that is, decoding starts at anchor macroblock 815 that is closest to macroblock 820 at the top-left of ROI 810. The decoding ends at the end of the ROI, that is, at macroblock 825.

As appreciated by one of ordinary skill in the art, decoding of macroblocks proceeds according to a pre-defined scanning order. The top-left coordinate of an ROI is chosen as the coordinate of reference for starting the decoding process as it is the first coordinate of the ROI scanned during decoding. Another coordinate may be chosen (e.g., the top-right, bottom-left, or bottom-right coordinates) for a different scanning order without deviating from the principles and scope of the invention.

In addition, as further appreciated by one of ordinary skill in the art, the number of anchor macroblocks used to code a given sequence corresponds to the number of access points for extracting ROIs from the video sequence. A trade-off exists between the desired number of anchor macroblocks and the additional, albeit small, overhead required to identify the anchor macroblocks in the SEI portion of the bit stream. Users may desire to have an anchor macroblock distribution that provides a good number of access points without sacrificing on the additional overhead. The anchor macroblocks should be distributed to extract ROIs easily and efficiently by the decoder.

Figure 9:
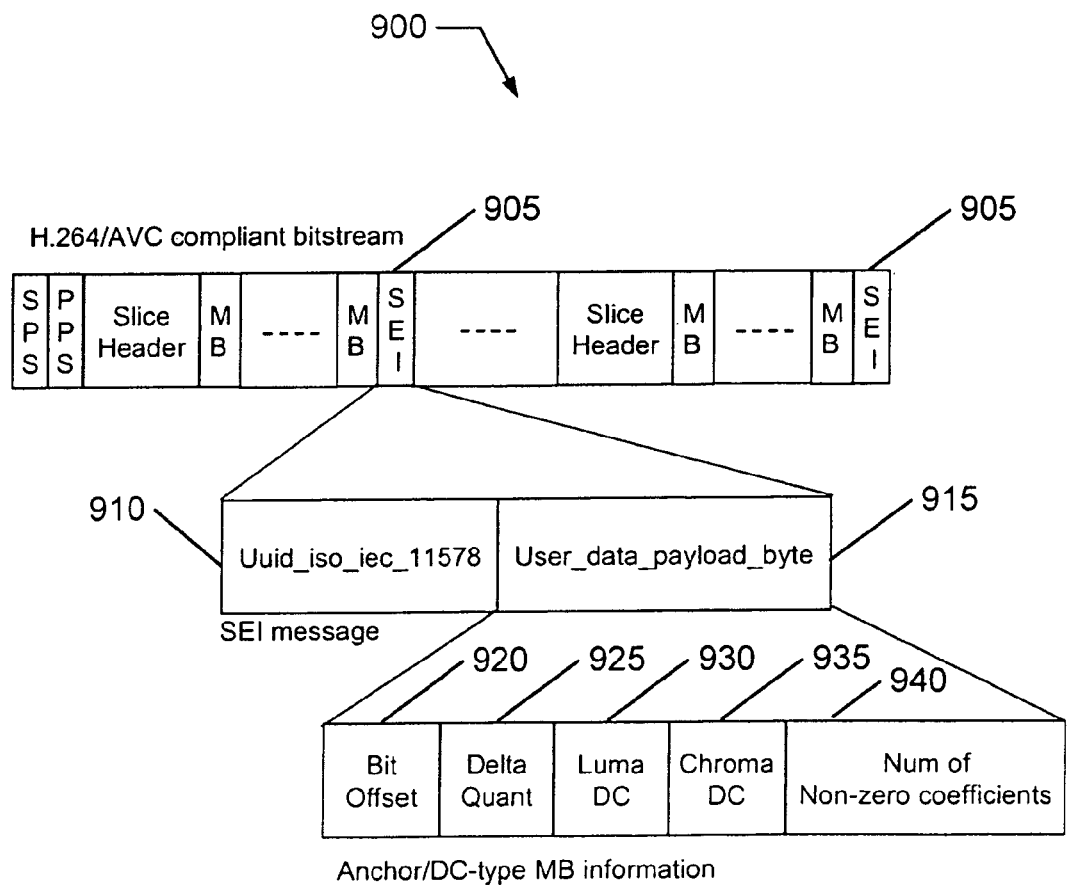
FIG. 9 illustrates a schematic diagram of an encoded bit stream in accordance with an embodiment of the invention.

Referring now to FIG. 9, a schematic diagram of an encoded bit stream in accordance with an embodiment of the invention is described. Bit stream 900 is an exemplary bit stream fully compliant with the H.264 video coding standard. As specified in the standard, bit stream 900 may have one or more SEI sections 905 for including user-defined data. Each SEI section 905 is divided into a message portion 910 and a payload portion 915. The payload portion 915 may be used to include user-defined data, such as, in accordance with an embodiment of the invention, auxiliary information identifying the anchor macroblocks of the video sequence coded in bit stream 900.

The auxiliary information may include, for example, bit offset 920 for identifying the position of an anchor macroblock, delta quantization parameter 925 for specifying the delta quantization value used for coding the anchor macroblock, luma DC value 930 for specifying the luma DC prediction for the anchor macroblock, chroma DC value 935 for specifying the chroma DC prediction for the anchor macroblock, and the number of non-zero coefficients 940 for specifying the number of non-zero coefficients in the anchor macroblock.

It is appreciated that anchor macroblocks in a given intra-coded frame are identified in a single SEI section. That is the number of SEI sections 905 in bit stream 900 corresponds to the number of intra-coded frames in the video sequence. One of ordinary skill in the art appreciates that including the auxiliary information adds a small overhead to bit stream 900. Such small overhead is outweighed by the flexibility provided to decode bit stream 900 starting and ending at multiple access points.

Figure 10:
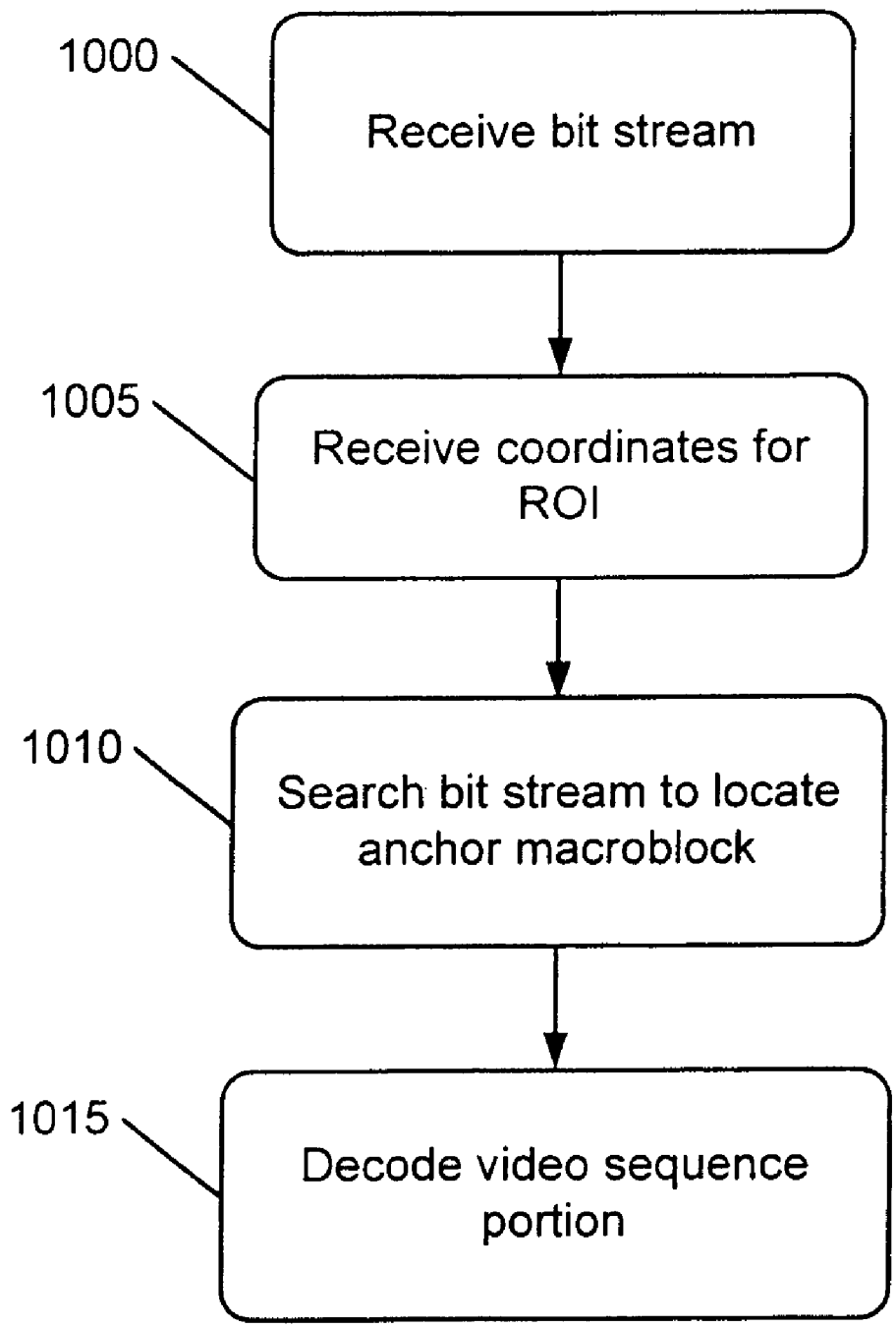
FIG. 10 illustrates a flow chart for decoding a video sequence in accordance with an embodiment of the invention.

FIG. 10 illustrates a flow chart for decoding a video sequence in accordance with an embodiment of the invention. First, a bit stream representing an encoded video sequence is received by the decoder in step 1000. Then a user specifies coordinates for a ROI that the user desires to extract from the bit stream in step 1005. As described herein above, the ROI coordinates may represent a rectangular area of a video frame. The coordinates may be specified by the user before or after viewing the video sequence. For example, in a video surveillance application, the ROI coordinates may be specified to correspond to an area being surveyed. The area may remain fixed regardless of the video sequence. In another example, a user may specify the ROI coordinates according to the size of the display screen used by the user to view the decoded video sequence.

After the ROI coordinates are specified, the decoder searches the SEI sections in the bit stream to locate an anchor macroblock that is closest to the ROI, that is, to locate an anchor macroblock that is closest to the top left coordinate of the ROI in step 1010. This is accomplished by translating the ROI coordinates into a bit offset and comparing it with the bit offsets stored at the SEI sections of the bit stream. Upon finding it, the decoder decodes a portion of the video sequence starting at that anchor macroblock and including the ROT specified by the user in step 1015. The portion of the video sequence is then displayed at the user's display screen.

It is appreciated that the invention enables a single bit stream to be distributed to multiple users with multiple display device capabilities. The bit stream is fully spatially scalable, enabling users to define and extract ROIs according to the capabilities of their display devices. Users decoding and viewing the video sequence with small mobile devices, for example, may be able to only decode and view small ROIs in their display screens. Users decoding and viewing the video sequence with personal computers may be able to decode the entire video sequence or decode a portion of it as desired. It is also appreciated that the ROI may be specified at any position and with any size, making it possible to view a video sequence by panning and scrolling, a desirable feature of small mobile devices.

Figure 11:
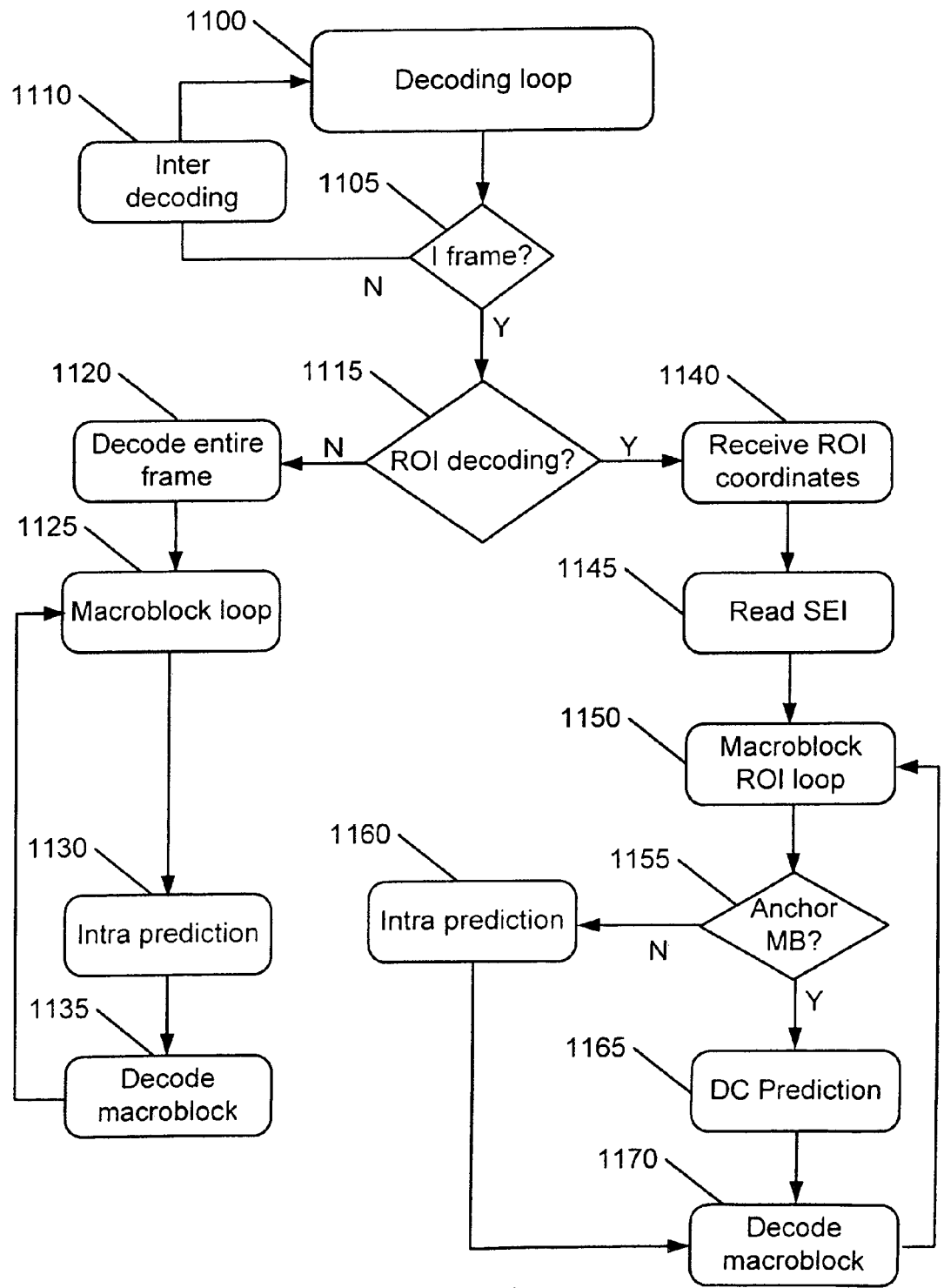
FIG. 11 illustrates a more detailed flow chart for decoding a video sequence in accordance with an embodiment of the invention.

Referring now to FIG. 11, a more detailed flow chart for decoding a video sequence in accordance with an embodiment of the invention is described. The decoding loop starts in step 1100 by checking in step 1105 whether the current frame being decoded is an intra frame. Inter frames are decoded as specified by the H.264 video coding standard in step 1110. For intra frames, the decoder checks in step 1115 whether the frame is to be decoded in its entirety or not, depending on whether a user has specified a ROI. If the entire frame is to be decoded in step 1120, the decoder proceeds to decode each macroblock in the frame in step 1125 by performing intra prediction in step 1130, and entropy decoding, inverse quantization, and inverse DCT in step 1135.

If only a portion of the frame is to be decoded, the decoder checks the received ROI coordinates in step 1140 and searches the bit stream for the anchor macroblock in the frame that is closest to the ROI in step 1145. The decoder starts decoding the frame at the anchor macroblock closest to the ROI and ends the decoding at the end of the ROI in step 1150. DC prediction is performed for each anchor macroblock in the frame in steps 1155 and 1165. Intra prediction is performed for each non-anchor macroblock in step 1160. The anchor and non-anchor macroblocks are decoded as specified in the H.264 standard with entropy decoding, inverse quantization, and inverse DCT in step 1170.

Figure 12:
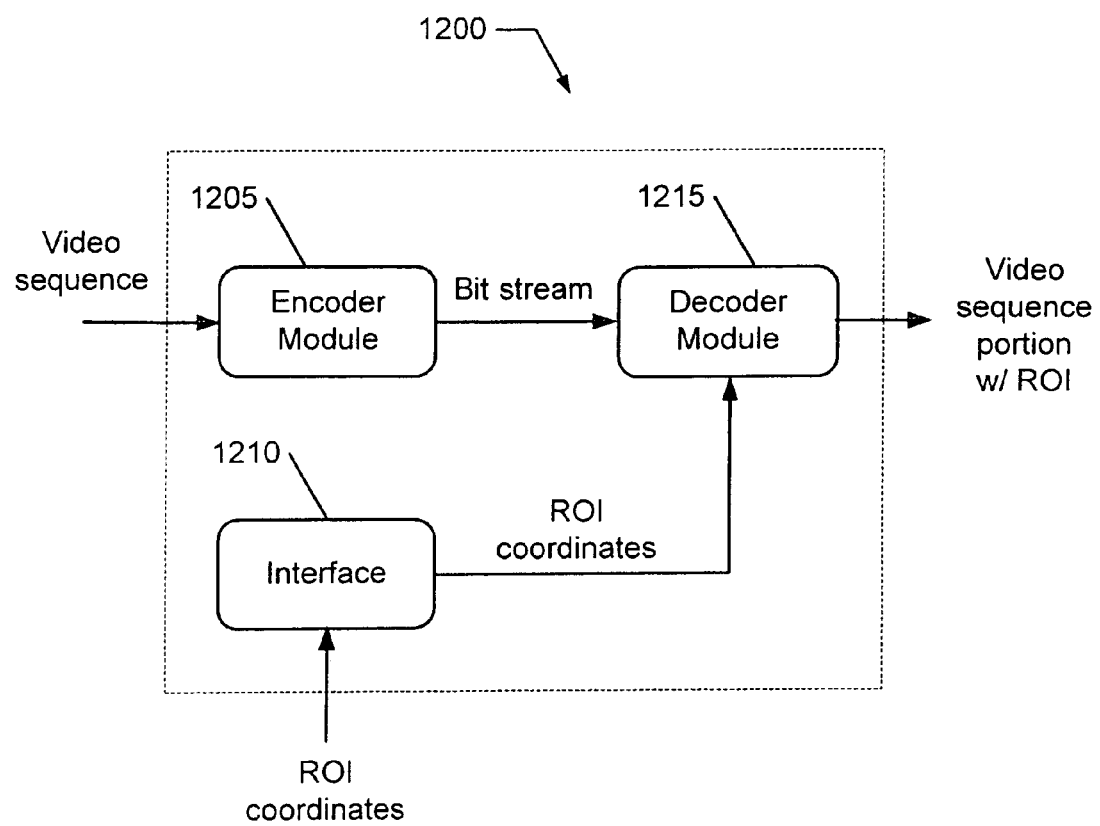
FIG. 12 illustrates a block diagram of an integrated circuit chip in accordance with an embodiment of the invention.

Referring now to FIG. 12, a block diagram of an integrated circuit chip in accordance with an embodiment of the invention is described. Integrated circuit chip 1200 has an encoder module 1205 for encoding a video sequence into a bit stream, an interface module 1210 for receiving ROI coordinates from a user, and a decoder module 1215 for decoding the bit stream to extract the entire video sequence or a portion of the video sequence corresponding to the ROI selected by the user. Integrated circuit chip 1200 may be a chip in a number of devices, such as, for example, personal computers, digital cameras, cameorders, personal digital assistants, hand-held mobile devices, gaming or other digital entertainment devices, and so on. As appreciated by one of ordinary skill in the art, the functions of encoder module 1205, interface 1210, and decoder module 1215 can be implemented with executable routines in one or more computer readable storage mediums.

Integrated circuit chip 1200 is shown with both an encoder module 1205 and a decoder module 1215. However, as appreciated by one of ordinary skill in the art, encoder module 1205 and decoder module 1215 could be housed in separate chips, such as an encoder chip and a decoder chip, in the same or different device(s) without deviating from the principles and scope of the invention. In this case, interface 1210 could be together with the decoder chip in a decoding device and the encoder chip could be part of the same decoding device or a separate encoding device. For example, an encoding chip may be part of a personal computer, video camera, digital camera, or other such device for acquiring and encoding a video sequence and a decoding chip may be part of a personal computer, personal digital assistant, wireless device, or other such device for receiving, decoding and displaying the video sequence.

In accordance with an embodiment of the invention and as described above, encoder module 1205 encodes a video sequence with anchor macroblocks that are spatially distributed in different access points of the video sequence and identified in a SEI section of the video sequence. Decoder module 1215, in turn, receives the bit stream from encoder module 1205 and ROI coordinates from interface module 1210 to decode the entire video sequence or a portion of the video sequence corresponding to the ROI. In the latter case, decoder module 1215 simply searches the bit stream to find an anchor macroblock closest to the ROI and starts decoding the bit stream from that anchor macroblock up to the end of the ROI.

It is appreciated that using the anchor macroblocks as access points for decoding the video sequence enables a single bit stream to be fully spatially scalable and flexible for use by multiple users at multiple devices in a wide variety of applications, including low and high bit rate applications as well as low and high resolution applications, such as video telephony, video gaming, video surveillance and many others. Users may extract video at different spatial resolutions and view ROIs having an arbitrary size and position. This enables, for example, a single video sequence to be displayed on multiple screens, with each screen showing a different ROI from the video sequence, or a video sequence to be viewed by panning and scrolling in a small hand-held mobile device, a highly desirable feature for users to view large size video and images. Other applications are also possible within the scope of the invention.

Figure 13A:
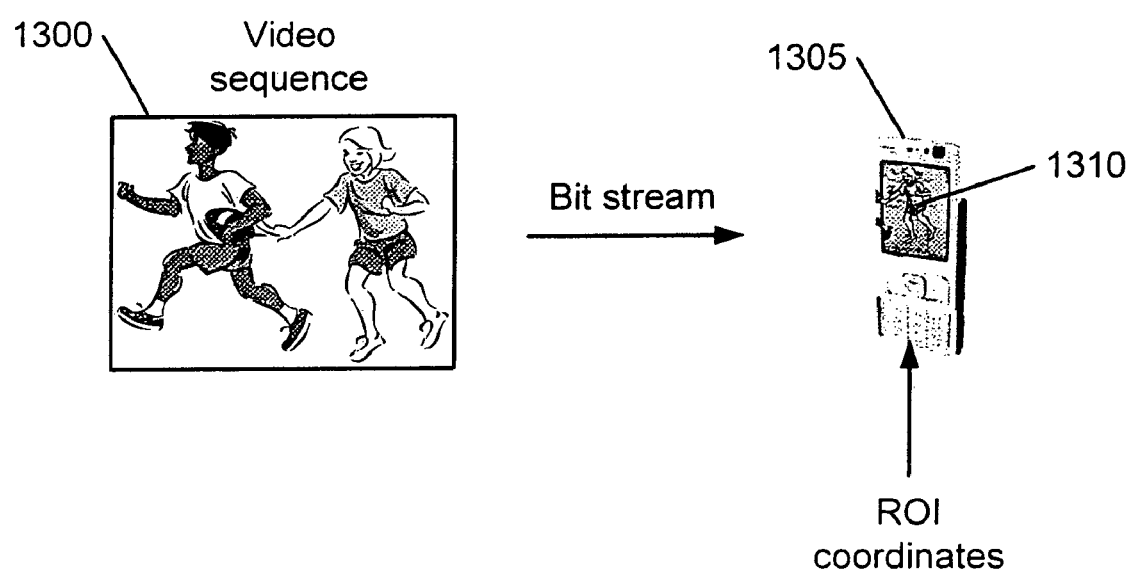
FIG. 13A illustrates an application in which one or more embodiments of the invention may operate.
Figure 13B:
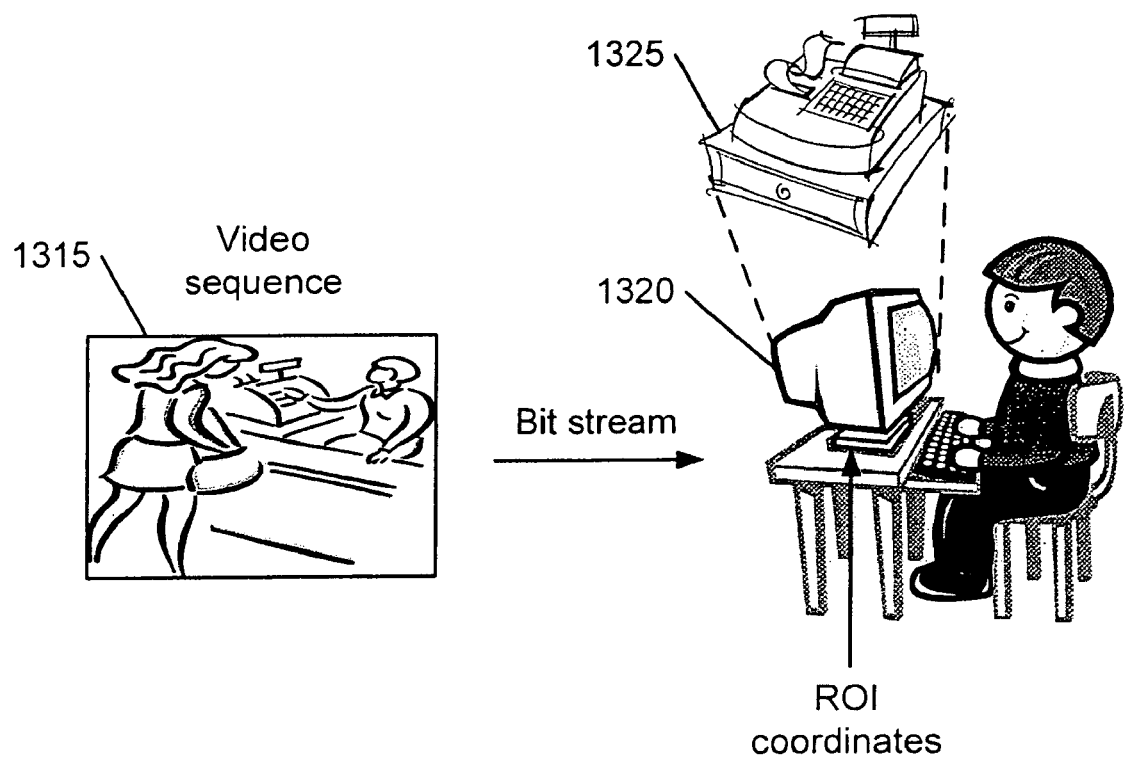
FIG. 13B illustrates another application in which one or more embodiments of the invention may operate.

For example, FIGS. 13A-B illustrate applications in which one or more embodiments of the invention operate. In FIG. 13A, video sequence 1300 is encoded into a bit stream that is sent to a small hand-held mobile device 1305 having a small display screen. A user of device 1305 may elect to decode only a portion of video sequence 1300, such as a ROI. The user may select ROI coordinates that correspond to a desired region from the video sequence 1300, such as for example, region 1310 corresponding to one of the football players shown in the video. Doing so enables the user to enjoy viewing a video of region 1310 according to the capabilities of device 1305.

Similarly, in FIG. 13B, video sequence 1315 is encoded into a bit stream that is sent to a personal computer 1320. In this case, personal computer 1320 has a large display screen. A user of personal computer 1320 may elect to decode the entire video sequence or a portion of it, such as a ROI. For example, suppose that personal computer 1320 is part of a surveillance system in a store. Video sequence 1315 may be extracted at a video camera in the store focusing on one of the cashiers to supervise the cash register at all times. The store's security personnel may view video sequence 1315 in personal computer 1320 to investigate a shoplifting charge. To get a better view of the cash register, security personnel may select to only decode and view the portion of video sequence 1315 corresponding to the cash register, such as portion 1325. In this case, the ROI coordinates may be specified a priori by adjusting the position of the video camera relative and selecting the coordinates to focus on the cash register.

Advantageously, the present invention enables users to extract arbitrary-sized ROIs at arbitrary positions from a single, spatially scalable bit stream. The bit stream is fully compatible with the H.264 video coding standard and enables users at multiple devices with differing capabilities to access a video sequence (or portions thereof) at multiple resolutions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A non-transitory medium, comprising executable instructions to:
   select a plurality of macroblocks in a video sequence to be coded as a plurality of anchor macroblocks, the anchor macroblocks distributed across the video sequence and facilitating random access decoding of a portion of the video sequence;
   code the video sequence into a bit stream by an encoder;
   generate auxiliary information associated with the anchor macroblocks; and
   insert the auxiliary information associated with the anchor macroblocks in a supplementary section of the bit stream,
   wherein the executable instructions to code the video sequence comprise executable instructions to code the anchor macroblocks using a DC intra prediction mode, and
   wherein the auxiliary information comprises luma DC prediction values for the anchor macroblocks and chroma DC prediction values for the anchor macroblocks.

2. The non-transitory medium of claim 1, further comprising executable instructions to receive coordinates for a region of interest covering multiple macroblocks.

3. The non-transitory medium of claim 2, further comprising executable instructions to locate an anchor macroblock from the plurality of anchor macroblocks in the supplementary section of the bit stream, the anchor macroblock positioned close to a top-left coordinate for the region of interest.

4. The non-transitory medium of claim 3, further comprising executable instructions to decode a portion of the video sequence starting at the anchor macroblock and including the region of interest.

5. The non-transitory medium of claim 1, wherein the anchor macroblocks comprise intra-coded macroblocks located in spatially apart positions in intra-coded frames of the video sequence.

6. The non-transitory medium of claim 1, wherein offset positions for the anchor macroblocks in the bit stream represent the positions of the anchor macroblocks in the intra-coded frames of the video sequence.

7. The non-transitory medium of claim 1, wherein the bit stream comprises a H.264 compliant bit stream.

8. The non-transitory medium of claim 7, wherein the supplementary section comprises a H.264 compliant supplementary enhancement information section in the H.264 compliant bit stream.

9. A non-transitory medium, comprising executable instructions to:
   receive a bit stream of a coded video sequence having a plurality of coded macroblocks, the bit stream comprising a supplementary section identifying a plurality of anchor macroblocks distributed across the coded video sequence;
   receive coordinates for a region of interest;
   search the bit stream to locate an anchor macroblock in the supplementary section, the anchor macroblock positioned close to the region of interest;
   decode a portion of the video sequence starting at the anchor macroblock and including the region of interest by a decoder; and
   select a plurality of macroblocks to be coded as anchor macroblocks, the anchor macroblocks located in spatially apart positions in intra-coded frames of the video sequence,
   wherein the supplementary section of the bit stream comprises auxiliary information associated with the anchor macroblocks, and
   wherein the auxiliary information comprises luma DC prediction values for the anchor macroblocks and chroma DC prediction values for the anchor macroblocks.

10. The non-transitory medium of claim 9, further comprising executable instructions to code the anchor macroblocks using a DC intra prediction mode.

11. The non-transitory medium of claim 9, wherein offset positions for the anchor macroblocks in the bit stream represent the positions of the anchor macroblocks in the intra-coded frames of the video sequence.

12. The non-transitory medium of claim 9, wherein the bit stream comprises a H.264 compliant bit stream.

13. An integrated circuit chip for encoding and decoding a video sequence, comprising:
   an encoder module for encoding a video sequence with a plurality of anchor macroblocks in a bit stream, the anchor macroblocks distributed at different positions in the video sequence;
   an interface module for receiving coordinates for a region of interest; and
   a decoder module for locating an anchor macroblock close to the region of interest in the bit stream and decoding a portion of the video sequence starting at the anchor macroblock and including the region of interest,
   wherein the bit stream comprises a supplementary section for identifying the anchor macroblocks with auxiliary information, and
   wherein the auxiliary information comprises luma DC prediction values for the anchor macroblocks and chroma DC prediction values for the anchor macroblocks.

14. The integrated circuit chip of claim 13, wherein the anchor macroblocks comprise intra-coded macroblocks located in spatially apart positions in intra-coded frames of the video sequence.

* * * * *